United States Patent
Andrews et al.

(10) Patent No.: US 9,209,663 B2
(45) Date of Patent: Dec. 8, 2015

(54) APPARATUS AND METHODS FOR PASSIVE MAGNETIC REDUCTION OF THRUST FORCE IN ROTATING MACHINES

(71) Applicant: ACTIVE POWER, INC., Austin, TX (US)

(72) Inventors: James T Andrews, Austin, TX (US); Karl Thomas Schuetze, Austin, TX (US)

(*) Notice: Subject to any disclaimer, the term of this patent is extended or adjusted under 35 U.S.C. 154(b) by 46 days.

(21) Appl. No.: 14/048,577

(22) Filed: Oct. 8, 2013

(65) Prior Publication Data

US 2014/0210289 A1    Jul. 31, 2014

Related U.S. Application Data

(60) Provisional application No. 61/711,169, filed on Oct. 8, 2012.

(51) Int. Cl.

| | |
|---|---|
| H02K 7/02 | (2006.01) |
| F16C 32/04 | (2006.01) |
| H02K 7/09 | (2006.01) |
| H02K 5/16 | (2006.01) |
| H02K 5/173 | (2006.01) |

(52) U.S. Cl.
CPC ...... H02K 7/09 (2013.01); F16C 32/04 (2013.01); F16C 32/0461 (2013.01); H02K 5/16 (2013.01); H02K 7/025 (2013.01); H02K 5/1732 (2013.01); H02K 2205/03 (2013.01); Y02E 60/16 (2013.01)

(58) Field of Classification Search
CPC .................. H02K 7/02; H02K 7/025
USPC ............... 310/74, 90.5, 177; 318/253; 322/48
See application file for complete search history.

(56) References Cited

U.S. PATENT DOCUMENTS

| | | | | |
|---|---|---|---|---|
| 5,101,130 | A * | 3/1992 | Jayawant et al. | 310/90.5 |
| 5,315,197 | A * | 5/1994 | Meeks et al. | 310/90.5 |
| 5,731,645 | A * | 3/1998 | Clifton et al. | 310/74 |
| 5,929,548 | A | 7/1999 | Pinkerton et al. | |
| 6,700,258 | B2 * | 3/2004 | McMullen et al. | 310/90.5 |

(Continued)

FOREIGN PATENT DOCUMENTS

| | | |
|---|---|---|
| JP | 217487 A | 8/1994 |
| JP | 004570 A | 1/2000 |

*Primary Examiner* — Burton Mullins
(74) *Attorney, Agent, or Firm* — Hulsey Hunt & Parks, P.C.

(57) ABSTRACT

Apparatus and methods for providing a pre-determined axial thrust force profile for use in a rotating machine that includes a magnetically permeable rotor with first and second surfaces and a generally perpendicular shaft is disclosed. One or more bearings support the shaft and a coil induces flux in the rotor. First and second pole pieces disposed adjacent to the first and second surfaces define first and second gaps. A series magnetic circuit including the pole pieces, the gaps and the rotor carries flux generated by current flowing in the coil. Pole pieces and gaps provide substantially similar reluctance in both gaps. Magnetic saturation characteristics of a series magnetic circuit may provide a pre-determined axial force profile as a function of coil current. A first magnetic saturation characteristic may provide a maximum axial force at a first current magnitude. A second magnetic saturation characteristic may provide a lower axial force at a current greater than the first current. The saturation characteristic may be formed by configuring the geometry and dimensions of the poles. The axial force profile may be formed to reduce the net axial thrust load on the bearings.

36 Claims, 7 Drawing Sheets

(56) References Cited

U.S. PATENT DOCUMENTS

| | | |
|---|---|---|
| 6,703,735 B1 | 3/2004 | Gabrys |
| 6,781,269 B1* | 8/2004 | Shimada ..................... 310/90.5 |
| 7,635,937 B2* | 12/2009 | Brunet et al. ................ 310/90.5 |
| 2012/0299422 A1* | 11/2012 | Filatov ........................ 310/90.5 |
| 2013/0049507 A1* | 2/2013 | Lang ............................ 310/90.5 |

* cited by examiner

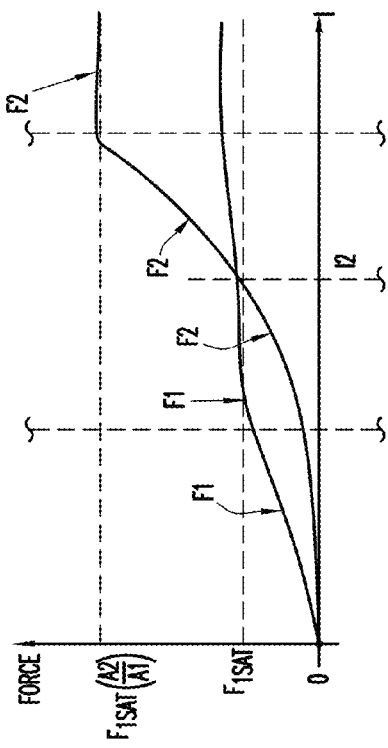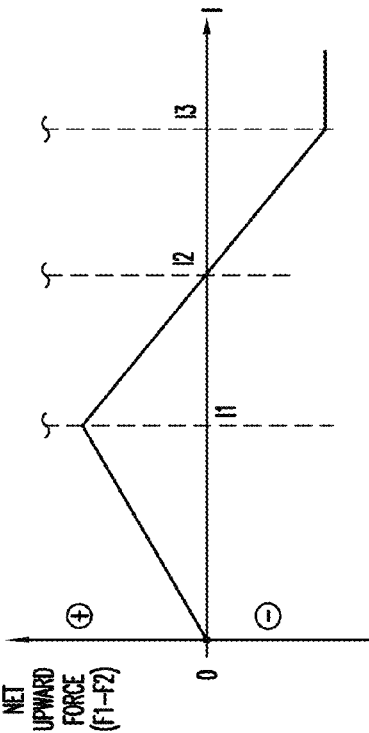
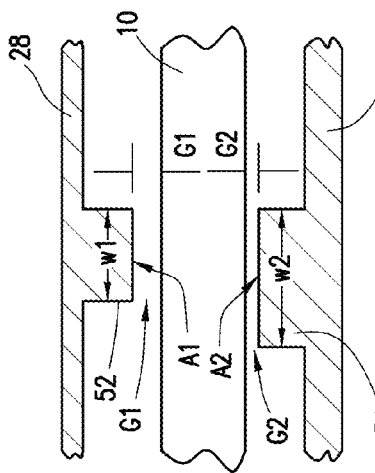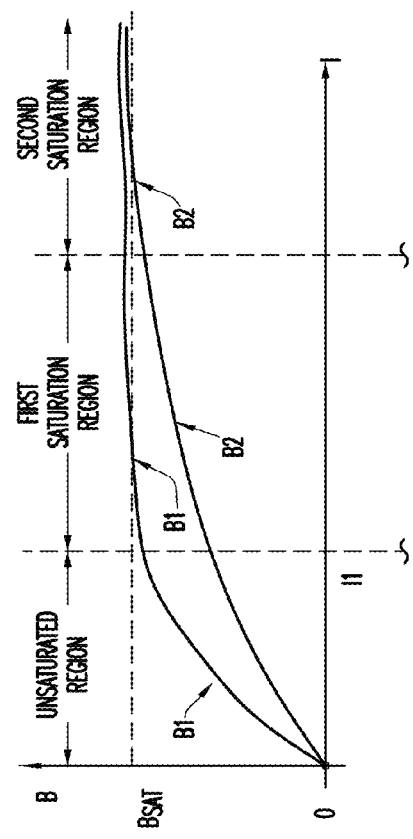
FIG. 9
FIG. 10A
FIG. 10B
FIG. 10C

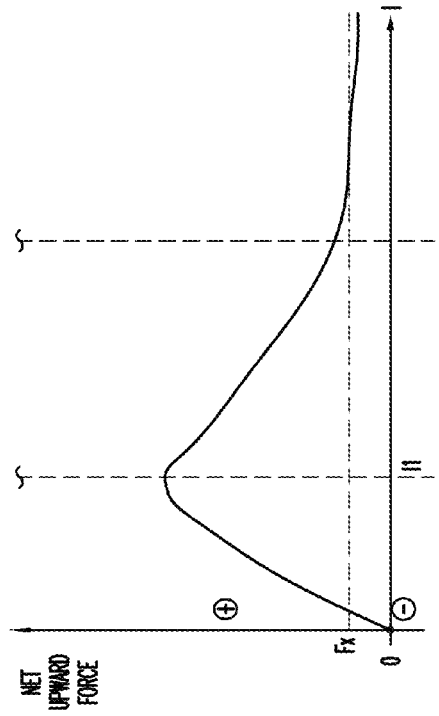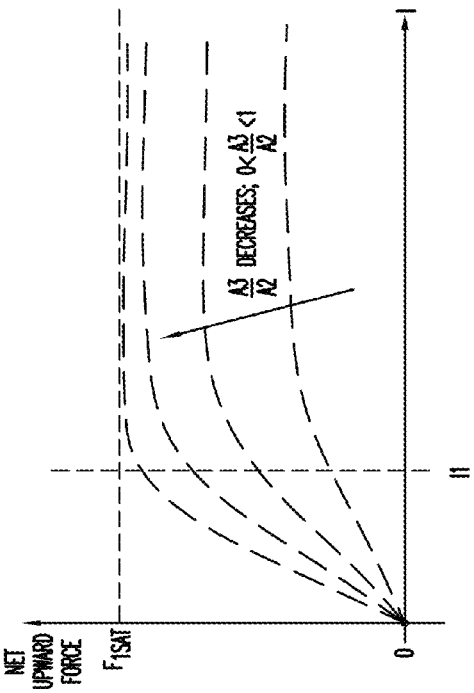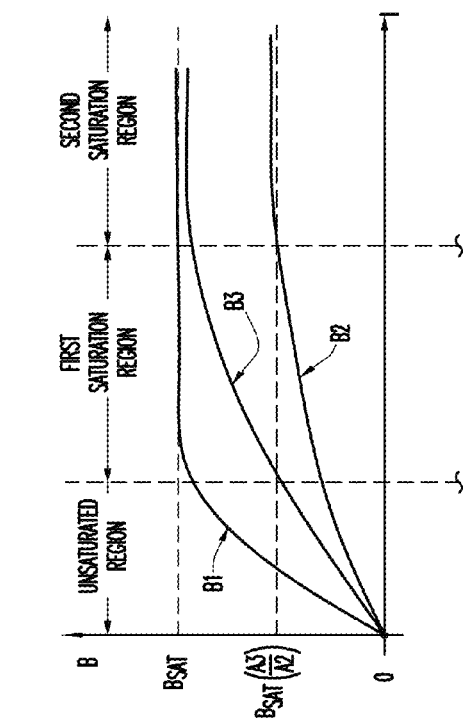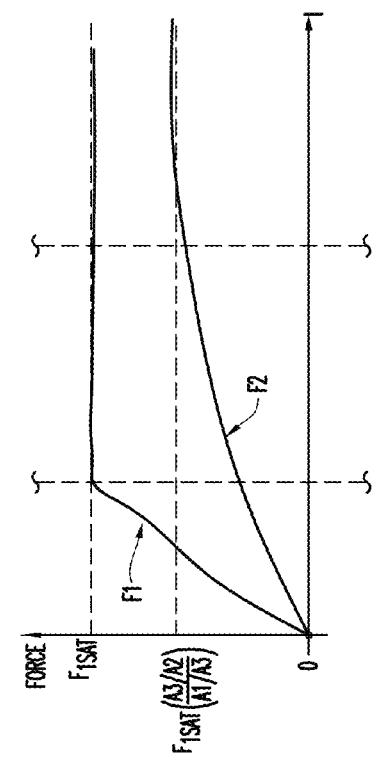
FIG. 11A
FIG. 11C
FIG. 11B
FIG. 12

APPARATUS AND METHODS FOR PASSIVE MAGNETIC REDUCTION OF THRUST FORCE IN ROTATING MACHINES

FIELD OF THE PRESENT DISCLOSURE

The disclosed subject matter relates to magnetic unloading circuits for reducing axial thrust force on a bearing that supports a rotating member. More particularly, the disclosed subject matter relates to passive magnetic unloading circuits for providing thrust force reduction in electrical machines including magnetically permeable rotor assemblies.

BACKGROUND

In certain electrical machines, such as motors, generators and alternators, a shaft passing through one or more bearings supports a rotor assembly. In machines having a vertical shaft configuration, axial thrust force on bearings, without compensating forces, will include the rotor weight. In certain machines, such as flywheel motor/generator devices appearing in uninterruptible power systems, rotor weight may be substantial. U.S. Pat. No. 5,969,457, "Energy Storage Flywheel Apparatus and Methods" (the '457 patent), and U.S. Pat. No. 5,929,548, "High Inertia Inductor-Alternator" (the '548 patent), which this disclosure incorporates herein by reference in their entirety, describe such flywheel motor/generators. Magnitudes of thrust loads on bearings in such machines affect both power losses and bearing life. Reducing overall thrust force on bearings extends bearing life and reduces mechanical friction losses.

Magnetic unloading circuits may offset gravity or other thrust load forces on bearings that support a rotor. Magnetic unloading circuits may be "active," "passive," or "semi-active." An active magnetic unloading circuit includes an electromagnet and a feedback controller for controlling unloading forces in response to feedback from a sensor (e.g., a force or displacement sensor). A passive unloading circuit, in contrast, uses no sensor feedback to control unloading forces. Instead, passive unloading circuits rely on forces that permanent magnets and/or electromagnets generate according to magnetic characteristics. "Semi-active" magnetic unloading circuits combine both active (e.g., feedback controlled electromagnets) and passive (e.g., permanent magnets) unloading elements.

Some rotating machines provide an "explicit" magnetic unloading circuit separate and distinct from the machine's primary magnetic circuit. An ideal explicit unloading circuit may be fully decoupled from a machine's primary magnetic circuit. In practice, however, there may be some magnetic coupling between unloading and primary magnetic circuits. Explicit magnetic unloading circuits are described in U.S. Pat. No. 4,444,444, entitled "Equipment for Storage of Energy Under Kinetic Form and Recovery Thereof in Electric Form and Method of Using Such Equipment" (the "'444 patent"), in U.S. Pat. No. 5,731,645, entitled "Integrated Motor/Generator/Flywheel Utilizing a Solid Steel Rotor" (the "'645 patent"), and U.S. Pat. No. 6,703,735, "Active Magnetic Thrust Bearing" (the "'735 patent") This disclosure incorporated fully and expressly the '444 patent, '645 patent, and '735 patent by reference, as though appearing here completely.

In some rotating machines, an "implicit" magnetic unloading circuit intentionally couples with the machine's primary magnetic circuit. Implicit circuits may use a sensor feedback circuit to maintain unloading within an appropriate range and may use a separate feedback circuit to control machine electrical performance. The '645 patent describes an example of an implicit magnetic unloading circuit and a homopolar inductor alternator device in which upper and lower field coils generate a combined primary air gap flux. The homopolar inductor alternator device controls primary field coil currents that flow in both the upper and lower coils in order to control the machine electrical performance (e.g., output voltage or torque). A load cell measurement of bearing thrust provides feedback control to generate a differential current that flows in the upper coil for maintaining a desired amount of thrust unloading.

BRIEF SUMMARY OF THE INVENTION

In one aspect, a rotating machine apparatus may include a magnetically permeable rotor including first and second substantially parallel rotor surfaces. One or more bearings support a shaft oriented substantially perpendicular to rotor surfaces. The shaft and bearings react a net thrust load in the shaft axial direction. A first air gap separates the magnetically permeable first pole piece from the first rotor surface. A second air gap separates a magnetically permeable second pole piece from the second rotor surface. A permeable magnetic structure completes a series magnetic circuit and includes these first and second pole pieces, first and second air gaps, and a magnetically permeable rotor. A coil induces a magnetic flux in this series magnetic circuit, wherein the flux magnitude varies as a function of both the current magnitude flowing in the coil and a series magnetic circuit with known magnetic saturation characteristics.

As magnetic circuit flux flows a magnetic force results on the rotor and may provide a rotor net thrust load profile as a function of coil current. The magnitude of the coil current varies over a range of currents.

Implementation of an apparatus according to the present disclosure may include one or more of the following features. A series magnetic circuit in a first region of operation for a magnetic force that increases with increasing coil current until coil current reaches a first current magnitude. At this first current magnitude, a resulting magnetic force reaches a pre-determined maximum value according to a first series magnetic circuit saturation characteristic. This first magnetic saturation characteristic may include a saturation characteristic of a pole piece. A pre-determined net thrust load profile reduces the net thrust load. The thrust load profile causes the net thrust load polarity to remain approximately constant or, alternatively, change in response to current magnitude changes. The current, which may be a function of the rotor speed generates force according to magnetic saturation characteristic for the unloading pole pieces.

A first cross-sectional area A1 and a first gap length G1 characterize the first air gap. A second cross-sectional area A2 and a second gap length G2 characterize the second air gap. One embodiment of the present disclosure forms the pole pieces so that the ratio A1/G1 substantially equals the ratio A2/G2.

The series magnetic circuit may also exhibit a pre-determined second saturation characteristic. This second saturation characteristic occurs in a second region of operation where coil currents are greater than the first current magnitude. The second saturation characteristic defines a lower limit on the magnetic force and may include a pole piece saturation characteristic.

In some embodiments, a rotor weight characterizes the rotor, as do the rotor top and bottom surfaces, and a shaft with vertically extending sections emanating from each surface. Bearings may include a top bearing above the top surface and a bottom bearing below the bottom surface. Magnetic force may be directed vertically upward to reduce the net thrust load in the downward direction to a value less than the rotor weight. In some embodiments the net thrust load may always be directed downward.

BRIEF DESCRIPTION OF THE DRAWINGS

FIG. 9 shows a pole configuration in an apparatus according to the present disclosure;

FIGS. 10A, 10B, and 10C display graphs relating to flux densities, axial force components, and net axial unloading force in the present disclosure;

FIGS. 11A, 11B, and 11C present graphs relating to flux densities, axial force components, and net axial unloading force according to the present disclosure;

FIG. 12 provides a family of graphs showing net axial unloading force in a configuration of an apparatus according to the present disclosure;

Like reference numbers in the various drawings indicate like elements.

DETAILED DESCRIPTION OF ILLUSTRATIVE EMBODIMENTS

Figures 1, 2:
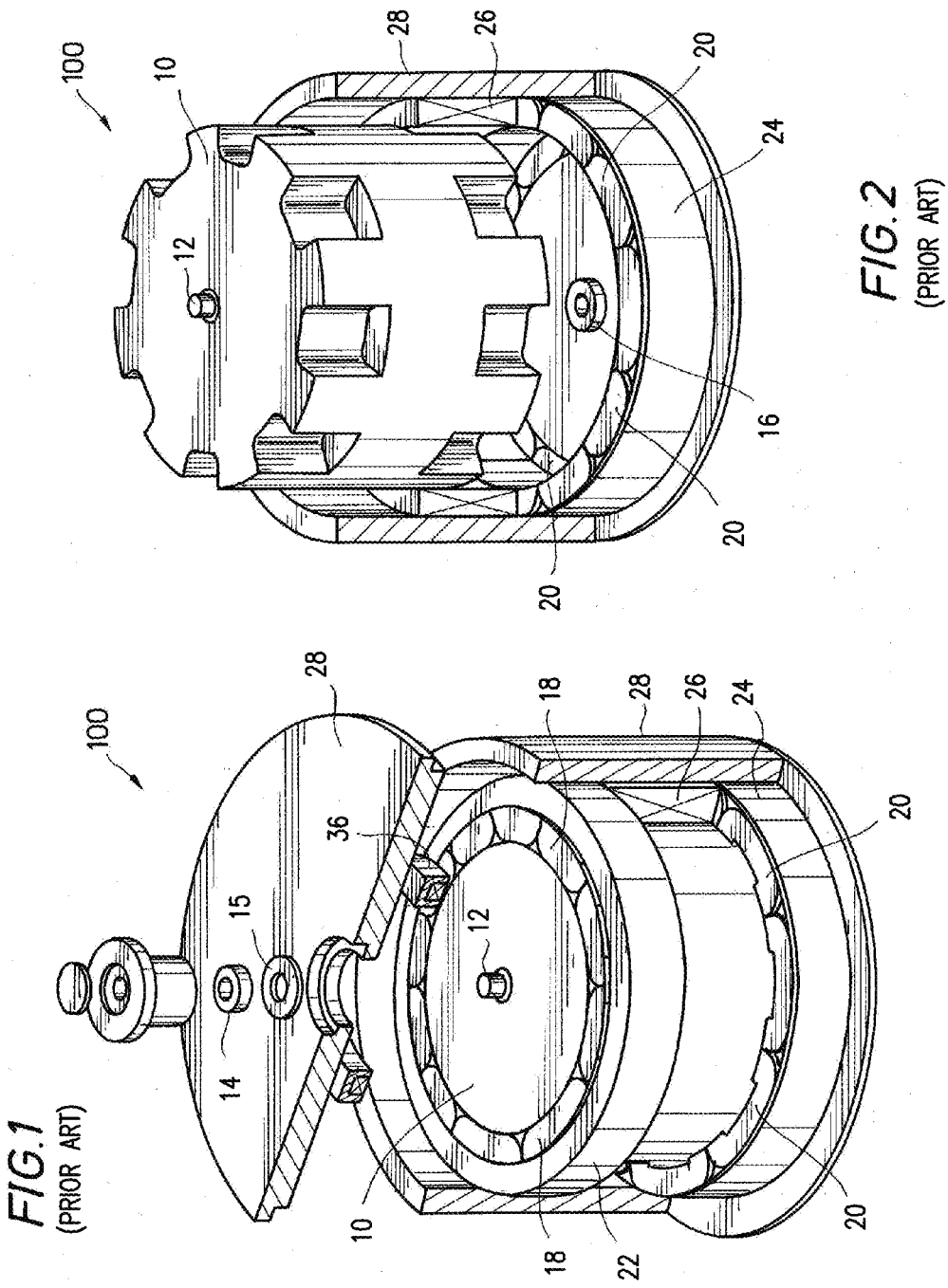
FIG. 1 displays a cutaway perspective view of a prior art inductor alternator device apparatus.
FIG. 2 shows a cutaway perspective view of the prior art inductor alternator device apparatus showing the rotor geometry.
Figure 3:
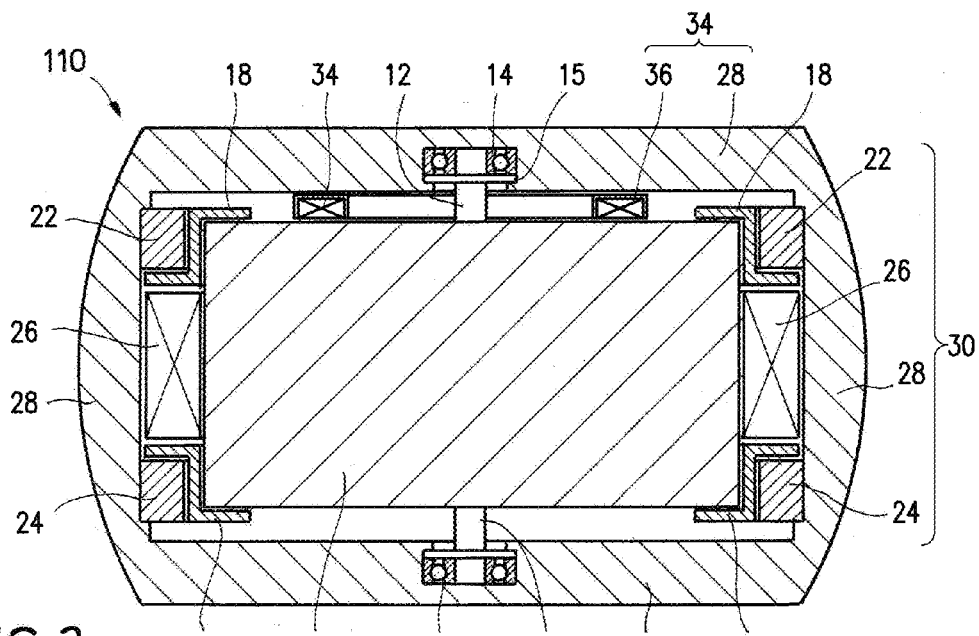
FIG. 3 presents a cross-section through the center of the prior art inductor alternator device apparatus.

FIGS. 1, 2 and 3 show construction of a homopolar inductor alternator device 100 of the kind described in the '548 patent (For clarity, FIG. 2 shows alternator device 100 in a partially disassembled state). Alternator device 100 includes a magnetically permeable (e.g., steel) rotor 10; shaft 12; bearings 14 and washer 15, 16 for supporting shaft 12; a set of first armature windings 18 and second armature windings 20; magnetically permeable rings 22, 24 (preferably made of high permeability material); field winding 26; and magnetically permeable (e.g., steel) case 28. In operation as a flywheel energy storage device, current in field winding 26 induces magnetic flux in a primary magnetic circuit 30 current including field winding 26, case 28, permeable rings 22, 24, armature windings 18 and 20, and rotor 10 (see, e.g., flux lines 32, FIG. 4). Under steady-state conditions, a DC current in field winding 26 induces an essentially constant homopolar flux to provide a primary magnetic circuit. Electrical excitation of armature windings 18 and 20 cause rotor 10 to rotate for storing energy in rotor 10. In such operation, alternator device 100 acts as a flywheel energy storage device. Loading armature windings 18 and 20 extracts energy from rotating rotor 10. More detailed operating and construction details for inductor-alternator device 100 appear in the '548 patent.

Alternator device 100 preferably operates supporting shaft 12 in a vertical orientation. To reduce axial thrust loads on bearings 14, 16, a prior-art alternator device 100 includes magnetic unloading circuit 34. Secondary magnetic circuit 34 includes electromagnet 36 disposed above rotor 10, as indicated in FIGS. 1 and 3. Prior art secondary magnetic circuit 34 operates as a magnetic unloading circuit that includes electromagnet 36, case 28, and rotor 10. Secondary magnetic circuit 34 may operate in a passive mode or in an active mode. In the passive mode, current in electromagnet 36 may be unchanging. In the active mode, current in electromagnet 36 may provide feedback control using a feedback signal from a sensor control circuit.

Figure 4:
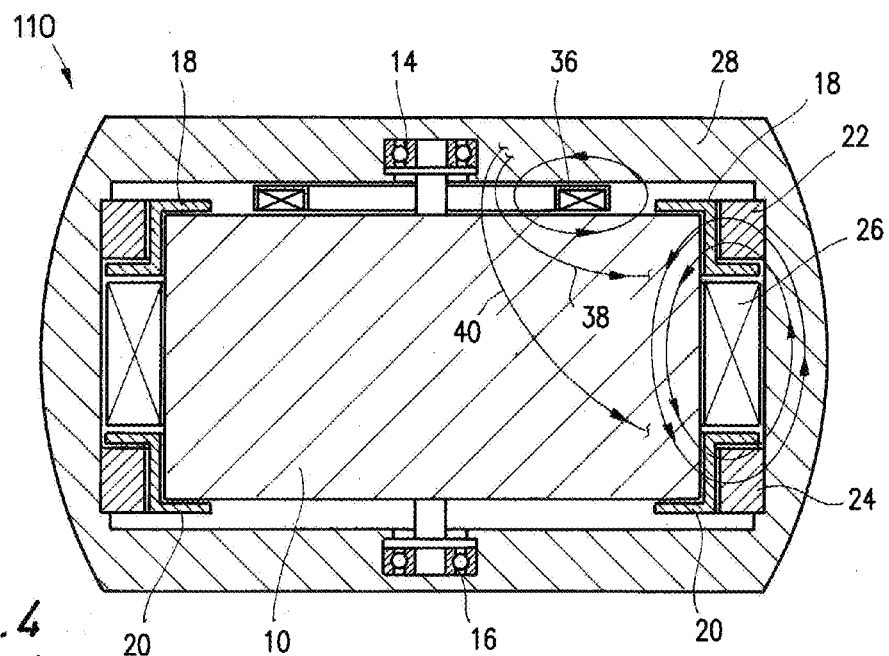
FIG. 4 depicts a rotating machine apparatus including a prior art magnetic unloading apparatus and rotating machine flux paths.

The magnetic field interactions between primary magnetic circuit 30 and secondary magnetic circuit 34 cause operational problems, as FIG. 4 shows with the use of flux lines 32. Flux lines 32 illustrate magnetic coupling between the field winding 26 and the first and second armature windings 18, in primary magnetic circuit 30. Because of the symmetrical configuration of field winding 26 and armature windings 18 and 20, the flux that couples field winding 26 and first armature windings 18 substantially equals, but opposes in polarity, the flux that couples field winding 26 and second armature windings 20.

Note that some of flux that electromagnet 36 generates also couples into the secondary armature windings 20, and vice versa, as partial flux lines 38 and 40 show. Partial flux line 38, which couples with first armature winding 18 has the same polarity, but different magnitude, from partial flux line 40, which couples with second armature winding 20. This magnitude difference results from the distance difference between electromagnet 36 and the two armature windings 18 and 20. This distance difference alters flux path reluctances.

In operation, flux differences in the primary magnetic circuit 30 and secondary magnetic circuit 34 may lead to imbalances in the voltages and currents appearing in first armature windings 18 and second armature windings 20, respectively. Under transient conditions, such as a sudden change in field current associated with a rapid transition from energy storage to energy delivery modes of operation, field interaction may cause shock loading, or unloading, of bearings 14, 16. This loading change may arise from a net force change that electromagnet 36 generates.

Figure 5:
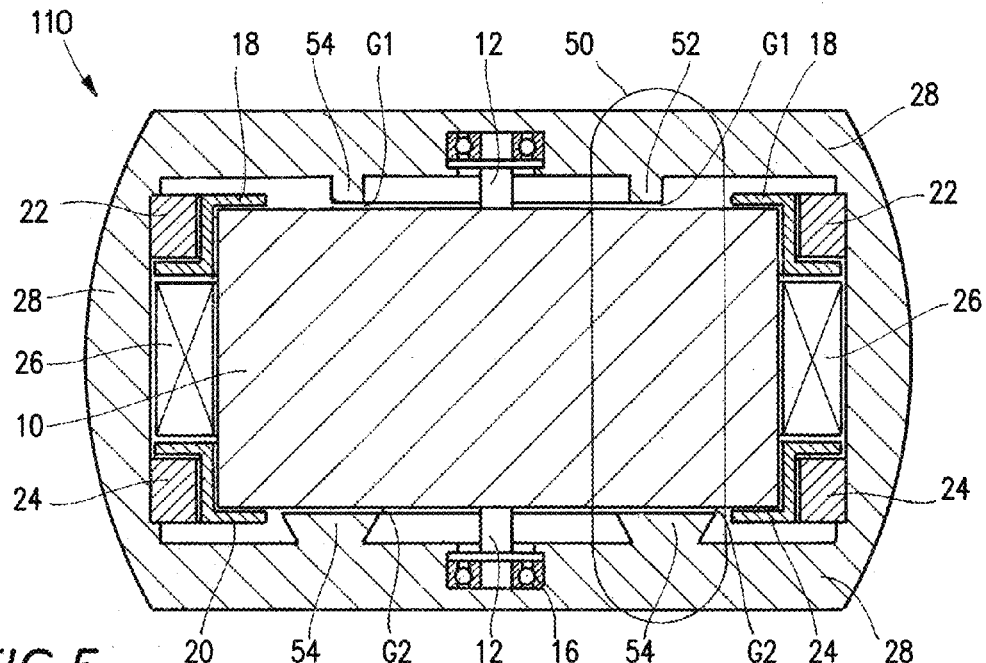
FIG. 5 demonstrates a rotating machine apparatus including a magnetic unloading apparatus according to the present disclosure.
Figure 6:
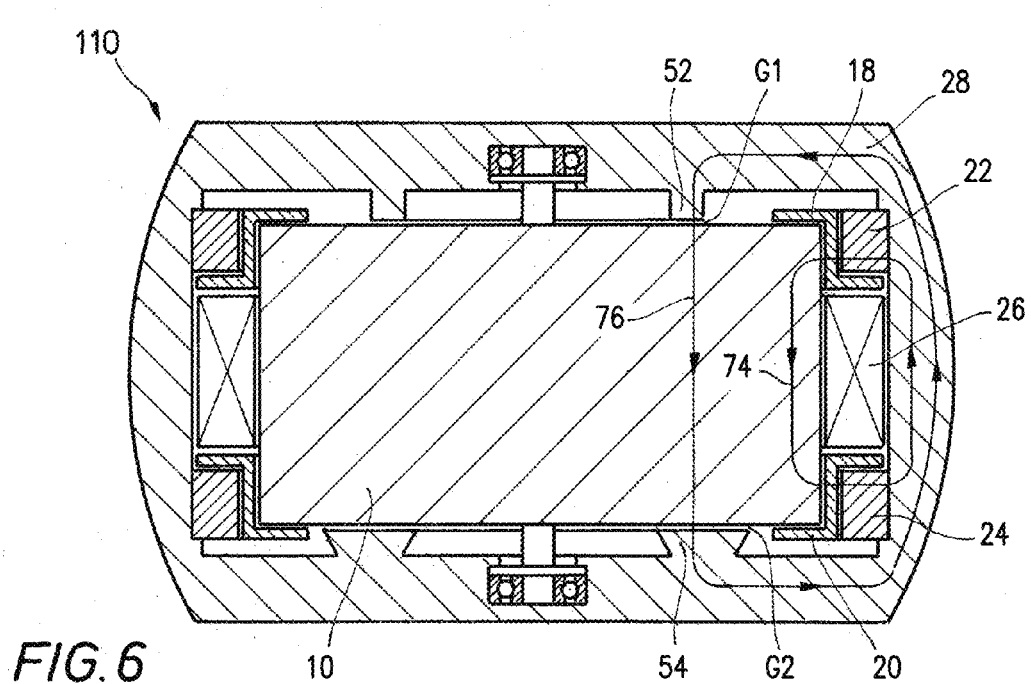
FIG. 6 graphs flux paths in the apparatus of FIG. 5.
Figure 7:
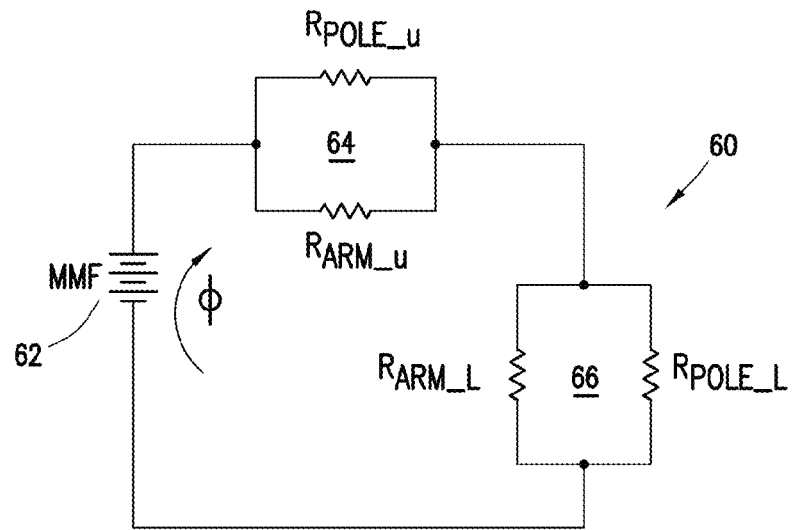
FIG. 7 shows a magnetic circuit diagram for referencing the magneto-motive force (MMF) balances arising in the presently disclosed subject matter.

FIGS. 5 and 6 show cross-sectional views of a rotating machine 110 including a passive magnetic unloading circuit 50 according to the present disclosure. Rotating machine 110 in FIGS. 5 and 6 functions similar to alternator device 100 of FIGS. 1 through 4. Note that the disclosed subject matter applies to a wide variety of rotating machines operating in any physical orientation, as discussed further below. FIG. 7 shows an exploded view of the portion with reference "A" of FIG. 5. FIG. 7 purposely alters scale of various elements to aid in description of the novel aspects of the present disclosure.

Referring to FIGS. 5 and 6, rotating machine 110 includes a first unloading pole piece 52 and a second unloading pole piece 54. Unloading pole pieces 52 and 54 may be annular magnetically permeable rings arranged symmetrically around supporting shaft 12, with either or both formed as separate pieces attaching to case 28. Alternatively, either of unloading pole pieces 52 or 54 may form as integral protrusions from case 28.

FIG. 7 conceptually depicts a magneto-motive force (MMF) circuit 60 to illustrate the dynamics that passive magnetic loading circuit 50 exhibits. Magnetic circuit 60 shows MMF source 62 creating magnetic flux Φ in magnetically parallel circuit 64. Circuit 64 arises from the association of the first unloading pole piece 52 reluctance $R_{POLE\_U}$ with upper armature gap reluctance $R_{ARM\_U}$. In series with circuit 64 appears magnetically parallel circuit 66. Circuit 66 arises from the association of the second unloading pole piece 54 reluctance $R_{POLE\_L}$ with lower armature gap reluctance $R_{ARM\_L}$. A view toward magnetic circuit 60 may assist in understanding the dynamics arising from the operation of rotating machine 110 now with the novel improvement of passive magnetic loading circuit 50.

Figure 8:
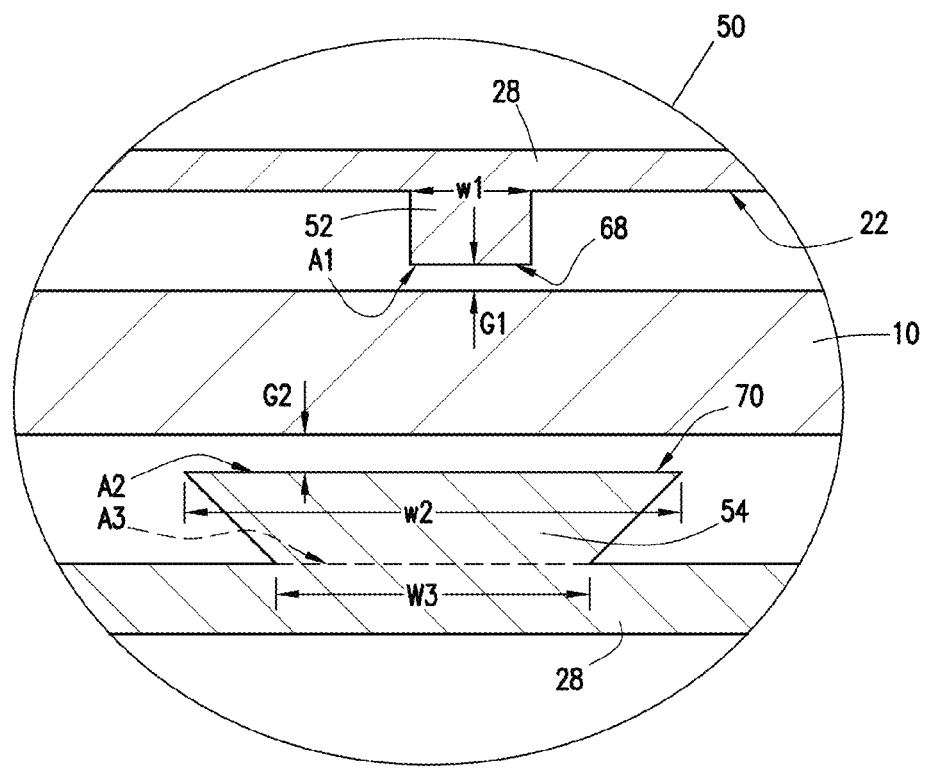
FIG. 8 exhibits an expanded view of a portion of the apparatus of FIG. 5.

FIG. 8 presents a conceptual cross-section diagram of passive magnetic loading circuit 50 formed according to one embodiment of the present disclosure. Referring to FIG. 8, first gap, G1, separates first unloading pole piece 52 from rotor 10. Second gap, G2, separates second unloading pole piece from rotor 10. First unloading pole piece dimensions may demonstrate a uniform cross sectional width, W1. First unloading pole piece 52 at first gap G1 has a first pole piece surface area A1 at surface 68. Second unloading pole piece 54 demonstrates a trapezoidal cross-section. Second unloading pole piece 54 at second gap G2 has a second pole surface area A2 and width W2 at surface 70. Case 28 interface 72 (dashed line) corresponds to area A3 (where A3<A2) and width W3.

Referring back to FIG. 6, primary magnetic circuit 30 flows flux lines 74 coupling field winding 26 to first and second armature windings 18 and 20. Passive magnetic unloading circuit 50 flows flux lines 76 through each of unloading pole pieces 52 and 54. The Primary magnetic circuit 30 passes through case 28, magnetic permeable rings 22 and 24, first and second armature windings 18 and 20, first and second gaps G1 and G2, and rotor 10. Passive magnetic unloading circuit 50 passes through case 28; first and second unloading pole pieces 52 and 54, and first and second gaps G1 and G2.

Passive magnetic unloading circuit 50 operates passively due to parallel arrangement with primary magnetic circuit 30 from which operation passive magnetic unloading circuit 50 derives flux. Passive magnetic unloading circuit 50 includes neither active flux generating elements nor feedback control circuitry. Design symmetry in primary magnetic circuit 30 causes substantially equal flux coupling between field winding 26 and first and second armature windings 18 and 20.

If the unsaturated magnetic reluctance (Reluctance=MMF/Flux) of first unloading pole piece 52 across gap G1 substantially equals the unsaturated magnetic reluctance of second unloading pole piece 54 across G2, then magnetic circuit (FIG. 7) operates symmetrically with respect to field winding 26. There is minimal interaction between the unloading circuit and armature circuit.

Magnetic reluctance, ignoring fringing effects, correlates positively with sizes of gaps G1 and G2 and inversely with areas A1 and A2 through which flux passes. Therefore, reluctance of gaps G1 and G2 may be made equal by forming first and second unloading pole pieces 52 and 54, gaps G1 and G2, and areas A1 and A2 so that G1/A1=G2/A2. In general, reluctance in gaps G1 and G2 may dominate total path reluctance if magnetic materials operate in an unsaturated state.

The loading forces in gaps G1, G2, ignoring fringing effects and assuming uniform gap flux density, increase with the square of the flux density and increase in proportion with the gap area A, as follows:

$$Force = K*A*B2 \quad (1)$$

Where K represents a material constant, A relates to gap G1, G2 area which flux passes, and B represents gap G1, G2 flux density. Now, $$B = FLUX/A \quad (2)$$

Where parameter, FLUX, represents gap G1, G2 magnetic flux. So, an equivalent expression for (1), above, is the following:

$$Force = K*FLUX2/A \quad (3)$$

Forming rotating machine 110 with substantially equal reluctances in gaps G1 and G2 and with neither first nor second unloading pole pieces 52 and 54 in saturation states results in substantially equal FLUX through each gap G1 and G2. Upward force F1, in first gap G1 obeys the expression, $F1=K*FLUX^2/A1$. Downward force F2, second gap G2, likewise, obeys the expression, $F2=K*FLUX^2/A2$. With A2 greater than A1, F1 exceeds F2, resulting in a net upward axial force on rotor 10. Appropriate design in rotor 10, case 28, and unloading pole pieces 52 and 54 make practical the compensation downward weight of rotor 10.

If A3 exceeds A1, increasing field current and flux may cause first unloading pole piece 52 to magnetically saturate, resulting in a saturation flux density $B_{sat}$, at an operational point prior to second unloading pole piece 54 magnetically saturating. At saturation, flux density B in first gap G1 substantially equals saturation flux density $B_{sat}$. At this point, an approximate expression for loading force in gap G1 becomes the following:

$$F1sat = K*A1*B\_sat^2 \quad (4)$$

As field winding 26 current continues to increase, force F1 may remain substantially constant, whereas force F2 in second gap G2 continues to increase, until second unloading pole piece 54 also saturates, yielding a saturation force $F2_{sat}$. Assuming an essentially constant force F1 in gap G1 at first unloading pole piece 52 saturation eases explanation of this principle without limiting the disclosed subject matter. Also consider that flux B and force $F1_{sat}$, $F2_{sat}$ derive from magnetic material properties for unloading pole pieces 52 and 54.

Referring to FIG. 8, flux F2 in second unloading pole piece 54 enters at interface 72, having area A3, and enters second gap G2 having an area A2, where A3<A2. Saturation in second unloading pole piece 54 occurs first in near interface 72, at an approximate flux level $FLUX_{sat2}=B_{sat}*A3$. Accordingly, flux density B2 in second gap G2 at saturation onset behaves the expression:

$$B2sat = FLUXsat2/A2 = Bsat*(A3/A2) \quad (5)$$

The geometry of unloading pole pieces 52 and 54 influences flux B at saturation onset. So, geometry influences forces F1 and F2 in corresponding gaps G1 and G2. First and second unloading pole pieces 52 and 54, for example, saturate at saturation flux density $B_{sat}$, assuming that both are made of the same material. For first unloading pole piece 52, where A1 measures essentially uniformly along pole piece 52 length, flux density B1 may equal $B_{sat}$. Here, force F1 in first gap G1 derives from A1 and $B_{sat}$. For second unloading pole piece 54, however, area A3 primarily determines magnetic saturation onset. As such, saturation flux density $B_{sat}$ in gap G2 derives from the ratio of A3 to A2. Accordingly, force F2 in second gap G2 depends on $B_{sat}$, A2 and A3. Because of this magnetic performance, a trapezoidal geometry in second pole piece 54 offers an additional degree of freedom for setting the saturation level force $F_{sat}2$ in gap G2.

The difference between F1 in first gap G1 and F2 in second gap G2 generates a net axial unloading force $F_{AX}$ on rotor 10.

Design of passive magnetic unloading circuit 50 allows tailoring axial unloading force profiles according to specific applications. By configuring case 28 and unloading pole piece 52 and 54 materials, dimensions, locations and saturation characteristics many different embodiments of passive magnetic unloading circuit are well within the scope of the present disclosure.

FIG. 9 shows example geometries for first and second unloading pole pieces 52 and 54. In FIG. 9, both unloading pole pieces 52 and 54 possess uniform cross-sections. First unloading pole piece 52 has uniform width W1 and area A1, while second unloading pole piece 54 has uniform width W2 and area A2. The embodiment of FIG. 9, width W2 exceeds W1 and area A2 exceeds A1.

FIGS. 10A, 10B, and 10C show approximate flux density B and force F profiles for the FIG. 9 embodiment in response to field current I variations. As in the above description, the simplified profiles of FIGS. 10A through 10C assume no fringing effects. A linear relationship exists between FLUX and field current, I, until reaching a sharp saturation characteristic for both pole pieces at a saturation flux density $B_{sat}$.

FIG. 10A shows flux densities B1 in first gap G1 and B2 in second gap G2. FIG. 10B shows axial forces F1 in first gap G1 and F2 in second gap G2. FIG. 10C shows net axial unloading force F3 as the difference between F1 in gap G1 and F2 in gap G2. In FIGS. 10A through 10C, B1 and F1 increase until first unloading pole piece 52 saturates. This occurs at a flux density $B1=B_{sat}$ and field current I=I1. As field current increases above I1, F1 increases in value so that F2 continues to increase until reaching saturation at a current I3, with I3 exceeding I1.

FIGS. 10A through 10C demonstrate an axial limit force F1 in first gap G1 following saturation that behaves according to the expression, $F1_{sat}=K*A1*B_{sat}^2$. As field current I increases above I1, force F2 in second gap G2 approaches an axial limit force consistent with the expression, $F2_{sat}=K*A2*B_{sat}^2=F1_{sat}*(A2/A1)$. Because $F2_{sat}$ exceeds $F1_{sat}$, net axial unloading force F3 passes through zero to become negative. For example, in a vertically oriented rotating machine 110 with first unloading pole piece 52 located above rotor 10, a net axial force F3 acts in a downward direction when field currents exceed a crossover current, I2, where I3>I2>I1. In some applications, this type of force reversal may be undesirable.

FIGS. 11A, 11B and 11C show, respectively, approximate flux density B, force F, and force profiles for first and second unloading pole pieces 52 and 54 for geometries wherein area A2 exceeds area A3, and area A3 exceeds A1. As above, these illustrative profiles assume no fringing effects, a linear relationship between FLUX and field current, I, and a sharp saturation characteristic for both pole pieces at a saturation flux density Bsat. FIG. 11A shows flux densities in the pole pieces 52 and 54 and gaps G1 and G2 functions of field current I. Flux density B1 relates to a density at first unloading pole piece 52 at first gap G1. Flux density B3 relates a density near area A3 of second unloading pole piece 54. Flux density B2 relates to a density in second gap G2. Flux density, B2 correlates positively with the flux density at area A2, owing to the geometry of the second unloading pole piece 54.

Varying dimensions of areas A2 and A3 permit adjusting flux density B2 and force F2 over a range of values. FIG. 11B conceptually depicts forces in gaps G1 and G2 corresponding to respective flux densities and areas. In the example of FIG. 11B, force approaches a limiting value, F2. Limit force, $F1_{sat}$, exceeds F2 according to appropriate selection of A1, A2 and A3. As a result, the net axial unloading force, F3 (FIG. 11C) remains positive after both pole pieces have saturated. An embodiment that may demonstrate performance corresponding to the FIG. 11C profiles may be a vertically oriented rotating machine 110 with first unloading pole piece 52 formed above rotor 10 to achieve a net axial force act in an upward direction.

Altering relative values of A1, A2 and A3 makes possible a variety of force profiles. For example, A1 and A3 may be formed so that both pole pieces saturate at substantially equivalent field current levels. In such an embodiment, limit force for increasing currents will then be a function of the A2 to A3 ratio. Making A2 large relative to A3 can make $B_{sat}$ and $F_{sat}$ at G2 small relative to $B_{sat}$ and $F_{sat}$ at G1, and vice versa. FIG. 12, for example, shows approximate net axial unloading force curves for the case of both unloading pole pieces 52 and 54 saturating at a field current I1 and where the ratio A3/A2 varies over the range zero to 1. In FIG. 12, F3 can vary between essentially zero (where A3/A2=1) and $F1_{sat}$ (where A2 greatly exceeds A3).

A force profile may have a design that meets the requirements of a particular application. In one example, a vertically oriented flywheel rotating machine 110 may store energy. Under standby conditions, field current I may vary within a narrow range as flywheel rotor 10 maintains a substantially constant rotational speed. For infrequent, short, periods, flywheel rotating machine 110 operates to discharge energy to a load. In such an rotating machine 110, rotor 10 may, for example, be hung from a rolling element thrust bearing. In such a configuration desirable operation may include unloading a substantial fraction of rotor 10 weight during standby. For example, an unloading force during standby may be set to 90% or 95% of rotor 10 weight. However, it may also be necessary to prevent unloading bearings 14, 16, such as controlling axial unloading force F3 to equal or exceed rotor 10 weight, cause unloading may cause heating and reduce bearing life. It may be preferable net thrust on bearings 14, 16 increase slightly during a short and infrequent discharge event, as this has essentially no effect on bearing life. For such a device, a preferable design has axial unloading force mildly "rolling over" to lower levels as field current ramps upward during a discharge event. For example, see FIG. 11C, where I1 may correspond to field current I at standby and where larger values of field current correspond to a discharge event. This may compromise the small margin between nominal unloading force (e.g., 95% of rotor weight) and total unloading (e.g., 100% of rotor weight). Such a small margin may arise, for example, from variations in iron properties, machine build tolerances, and excitation current.

Figure 13:
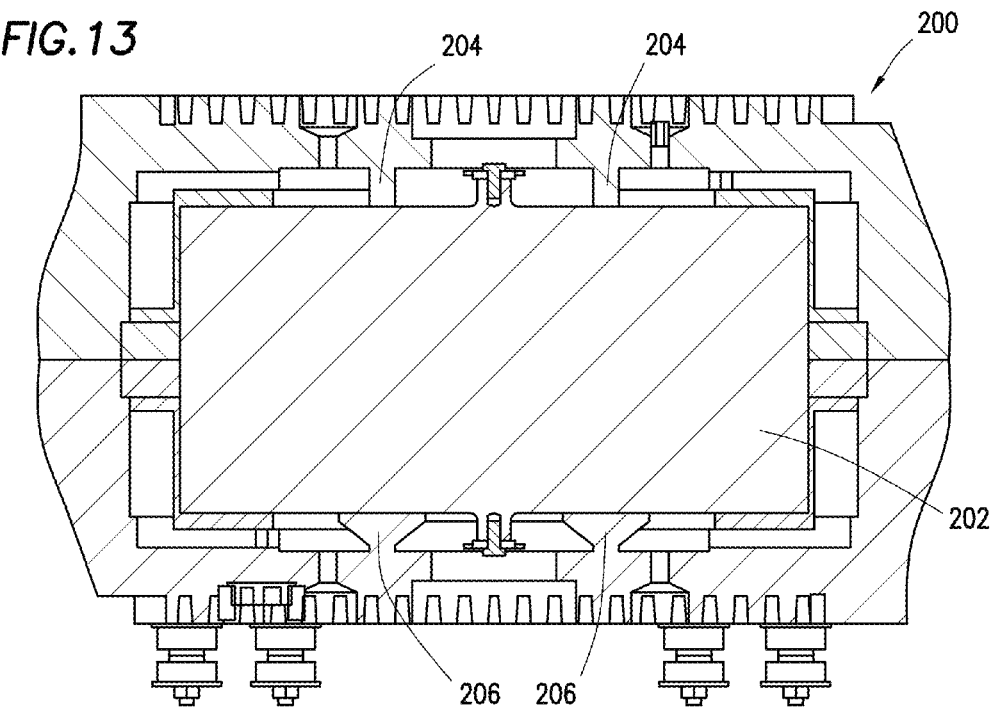
FIG. 13 displays a cross-section through the center of a homopolar inductor alternator device including a magnetic unloading circuit according to the present disclosure.

FIG. 13 shows a cross section of a vertically oriented homopolar inductor alternator device 200. Alternator device 200 operates as a flywheel energy storage and discharge device. Alternator device 200 includes steel rotor 202 weighing 1,712 pounds and having a diameter of 25.484" and a height of 12.46". Unloading pole pieces 204, 206 are cast iron annular rings having a mean diameter of 9.145" from shaft center. Upper pole piece 204 has width W1 of 1.03." Lower pole piece 206 has a 3.4" width W2 near steel rotor 202 and 1.03" width W3 at its base. First gap G1 measures nominally 0.040", while second gap G2 nominally measures 0.133".

Figure 14:
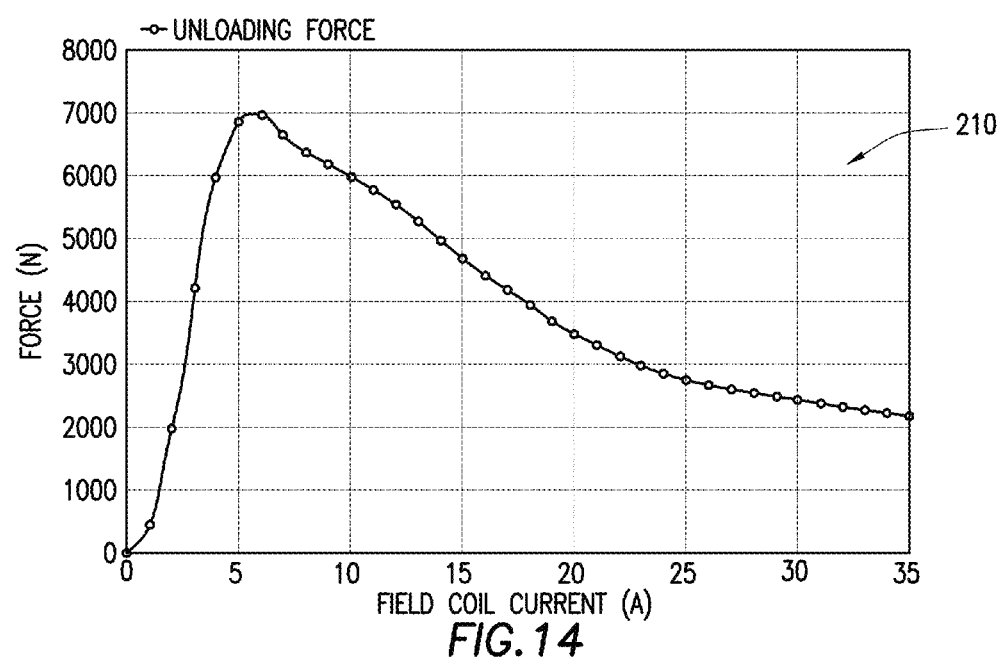
FIG. 14 shows a net axial unloading force graph for the alternator device of FIG. 13.

FIG. 14 shows graph 210 of axial unloading force as a function of field current for alternator device 200 of FIG. 11. Poles are formed to provide a maximum axial unloading force (7000 Newtons=1573 pounds force=92% of rotor weight) at a field coil current of approximately 5.6 amperes. This corresponds to a standby condition of alternator device 200. As shown in graph 210, first pole piece operates at its saturation threshold in standby, as indicated by the decline in unloading force as field current increases above 5.6 Amperes. As field current increases (indicating an energy discharge event) the axial unloading force decreases until the second pole piece enters saturation, at a field coil current of approximately 20 Amperes. Further increases in field current beyond 20 Amperes correspond to both poles being in saturation and a leveling off of the axial unloading force.

As an alternative to reducing a net downward force on a bearing in a vertically oriented machine, an unloading circuit according to the present disclosure may be constructed so that unloading force F1 exceeds 100% of rotor weight with an always-upward net axial thrust force F3 on bearings 14 and 16. In such an embodiment, it may be preferable that upward thrust on machine bearings climbs during a discharge event, to always provide unloading force large enough to prevent bearing unloading. Such a design would include a lower pole 54 that saturates more at standby than upper pole 52 and may, e.g., include a reversal of positions of upper and lower pole pieces 52 and 54 in configuration of FIGS. 5, 6 and 7.

As noted earlier, ratios G1/A1 and G2/A2 may be formed so that first and second gaps have substantially equivalent reluctance. In practice, manufacturing tolerances for machine parts (i.e., rotor, case, pole pieces) may require adjustment in rotor position relative to pole pieces in order to form G1 and G2. Because a larger gap has a correspondingly larger pole surface area than a smaller gap, and vice versa, a fixed dimensional error in gap length will cause less percentage error in the reluctance of the larger gap than it does on the smaller gap. Thus, the overall effect of tolerance error on gap reluctance may be minimized by adjusting the position of the rotor so that the smaller of the gaps (e.g., G1, FIG. 9) accurately adjusts to its desired value, thereby transferring substantially all of the dimensional errors into the larger gap.

The disclosed subject matter encompasses beyond those devices in which the axial loads are vertically directed. A magnetic unloading circuit according to the present disclosure may provide controllable axial forces irrespective of the device orientation. For example, bearings in machines with non-vertically oriented rotors (e.g., horizontally oriented, or oriented at an angle relative to the vertical), may be exposed to axial loads, due, e.g., to external axial loads on shaft or to windage loads associated with rotor rotation and/or fans.

It will be understood that various modifications may be made to the disclosed subject matters described herein without departing from the spirit and scope of the disclosed subject matter. For example, pole pieces may be constructed in a wide variety of geometries in order to achieve a desired unloading force profile. The unloading circuit may be formed so that saturation occurs in portion of the circuit other than the poles (or in addition to one or the other, or both, of the poles). For example, the cross-sectional dimensions of the case 28 may be embodied to provide a desired axial unloading force characteristic.

The present technical disclosure includes the above embodiments which are provided for descriptive purposes. However, various aspects and components of the disclosed subject matter provided herein may be combined and altered in numerous ways not explicitly described herein without departing from the scope of the disclosed subject matter, which the following claims particularly call out as novel and non-obviousness elements.

What is claimed is:

1. A device with a magnetically permeable rotor comprising first and second substantially parallel rotor surfaces;
   a shaft oriented substantially perpendicular to a rotor surface;
   one or more bearings supporting said shaft;
   a magnetically permeable first pole piece having a first cross-sectional area and being spaced apart from the first surface by a first air gap;
   a magnetically permeable second pole piece having a second cross-sectional area and being spaced apart from the second surface by a second air gap;
   a permeable magnetic structure completing a secondary magnetic circuit comprising the first magnetically permeable first pole piece and magnetically permeable second pole piece, the first air gap and second air gap, and the rotor;
   a housing; and
   a primary magnetic circuit, the primary magnetic circuit comprising a field winding within the housing, the primary magnetic circuit configured for inducing a magnetic flux in the secondary magnetic circuit, the magnitude of the magnetic flux varying as a function of the magnitude of a current flowing in the field winding and a pre-determined magnetic saturation characteristic of the secondary magnetic circuit, the magnetic flux generating a magnetic force on the rotor;
   said configuration of secondary magnetic circuit provides a pre-determined net thrust load profile on the rotor as a function of the field winding current, the magnitude of the field winding current being controlled to vary over a range of currents.

2. The device of claim 1, the secondary magnetic circuit further comprising a first region of operation where magnetic force increases with increasing field winding current until said field winding current reaches a first current magnitude, and the magnetic force reaches a pre-determined maximum value defined by a pre-determined first magnetic saturation characteristic of the secondary magnetic circuit.

3. The device of claim 2, the pre-determined net thrust load profile being configured so that the net thrust load changes in polarity as a function of current.

4. The device of claim 2, the secondary magnetic circuit comprising a second region of operation, characterized by field winding currents greater than the first current magnitude, and a pre-determined second saturation characteristic of the secondary magnetic circuit determining a lower limit on the magnetic force.

5. The device of claim 1, the secondary magnetic circuit controlling current magnitude as a function of a rotational speed of the rotor, and the secondary magnetic circuit configuration imparting the pre-determined net thrust load profile for a pre-determined first rotor speed.

6. The device of claim 1, configured to operate symmetrically, said device comprising:
   the first gap comprising a first cross-sectional area, A1, and a first gap length, G1;
   said second gap comprising a second cross-sectional area, A2, and a second gap length, G2; and
   configuring the ratio A1/G1 substantially equal to the ratio A2/G2 causing an unsaturated magnetic reluctance of the magnetically permeable first pole to substantially equal a unsaturated magnetic reluctance of the magnetically permeable second pole.

7. The device of claim 1, said shaft comprising a first section extending from the first surface and a second section extending from the second surface.

8. The device of claim 1, wherein:
   said rotor is characterized by a rotor weight;
   said first surface is a top surface, the second surface is a bottom surface, and the shaft comprises sections extending vertically from each surface;

said bearings comprise a top bearing positioned above the top surface and a bottom bearing positioned below the bottom surface; and the magnetic force is directed vertically upward so that the net thrust load in the downward direction reduces to zero or less, thus resulting in a net upward force.

9. The device of claim 1, the net thrust load being directed downward.

10. The device of claim 1, the pre-determined net thrust load profile being configured to reduce the net thrust load.

11. The device of claim 1, the pre-determined net thrust load profile being configured so that the net thrust load is always of the same polarity.

12. The device of claim 1, the first magnetic saturation characteristic comprising a saturation characteristic of at least one of the magnetically permeable first pole piece and the magnetically permeable second pole piece.

13. The device of claim 1, the first magnetic saturation characteristic comprising a saturation characteristic of at least one of the magnetically permeable first pole piece and the magnetically permeable second pole piece, and the second magnetic saturation characteristic comprises at least a second one of the magnetically permeable first pole piece and the magnetically permeable second pole piece.

14. The device of claim 1, the pre-determined net thrust load profile being configured to reduce the net thrust load.

15. The device of claim 1, the net thrust load profile being configured so that the net thrust load changes in polarity as a function of current.

16. A method for generating an axial thrust force profile in a rotating machine, comprising the steps of:
configuring the rotating machine to comprise a primary magnetic circuit, the primary magnetic circuit comprising a rotor;
the rotor comprising a first surface and a second surface, the first surface and the second surface aligned generally parallel to one another;
a shaft oriented substantially perpendicular to at least one of the first surface and the second surface of the rotor, and the shaft connected to the rotor,
one or more bearing for supporting the shaft, and
a field winding for carrying a current and generating a magnetic flux in the primary magnetic circuit, and the method comprising the steps of:
providing a first magnetic pole piece and a second magnetic pole piece;
configuring a first gap between the first magnetic pole piece and the first surface of the rotor;
configuring a second gap between the second magnetic pole piece and the second surface;
configuring the pole pieces so that current flowing in the field winding induces flux to flow in a secondary magnetic circuit, the secondary magnetic circuit comprising the first magnetic pole piece and the second magnetic pole piece, the first gap, the second gap, and the rotor; and
configuring a magnetic saturation characteristic of the secondary magnetic circuit to provide a pre-determined axial thrust force profile as a function of the magnitude of the current flowing in the field winding as the current varies over a range.

17. The method of claim 16, said step of configuring the magnetic saturation characteristics further comprising configuring a geometry and a dimension of a pole piece.

18. The method of claim 16, the second magnetic circuit further comprising a magnetically permeable structure for carrying flux between the coil and a pole piece and said step of configuring the magnetic saturation characteristics comprising configuring the geometry and dimensions of the magnetically permeable structure.

19. The method of claim 16, said step of configuring the magnetic saturation characteristic comprising the step of configuring a first magnetic saturation characteristic of the second magnetic circuit so that the axial thrust force increases with increasing coil current until the coil current reaches a first current magnitude at which the magnetic force reaches a pre-determined maximum value.

20. The method of claim 16, said step of configuring the magnetic saturation characteristic comprising the step of configuring a second magnetic saturation characteristic of the second magnetic circuit so that, as the coil current increases above the first current magnitude, the axial thrust force decreases toward a pre-determined lower limit.

21. The method of claim 16, further comprising the step of configuring the pole pieces and the gaps so that the reluctance of the first gap and second gap are substantially the same.

22. An uninterruptable power supply rotating machine providing for the reduction of axial thrust force using a passive magnetic reduction flux circuit, said rotating machine comprising:
a housing;
a field winding within the housing and being adapted to generate a balanced magnetic flux defining first and second portions;
a pair of armature windings;
a rotor, the first flux portion to flow through the housing, armature windings, and rotor; and
a pair of pole pieces formed as a structural portion of said housing for passively managing the magnetic saturation of the electromagnetic circuit existing during the operation of the uninterruptable power supply
said pair of pole pieces defining differing cross-sectional areas and being positioned between the housing and rotor, the pole pieces and the rotor defining gaps there between configured to have reluctances approximately equal to each other, the second flux portion to flow through the housing, pole pieces, gaps, and rotor, the differing cross-sectional areas to cause one of the pole pieces to saturate at a lower magnetic flux level than the other pole piece.

23. The machine of claim 22, the cross-sectional area of one of the pole pieces varying along a length of the pole piece which is aligned in a direction parallel to a shaft, said shaft being connected to the rotor.

24. The machine of claim 22, one of the pole pieces being trapezoidal.

25. The machine of claim 22, the pole piece which saturates at the lower magnetic flux level being positioned above the rotor and the other pole piece being positioned below the rotor.

26. The machine of claim 25, the machine being a flywheel inductor-alternator of an uninterruptible power supply.

27. The machine of claim 22, further comprising a shaft coupled to the rotor and a bearing positioned between the shaft and the housing to bear a thrust load associated with the shaft.

28. The machine of claim 22, a magnitude of the gaps being configurable to generate a user-selected net force to act on the rotor along a direction parallel to the shaft.

29. The machine of claim 28, a magnitude of the gaps being configurable to generate a user-selected net force profile.

30. The machine of claim 29, the user-selected net force profile includes including only positive net forces.

31. The machine of claim 28, the user-selected net force being approximately equal to a weight of the shaft.

32. The machine of claim 22, the machine having a standby condition defining a standby magnetic flux level, the pole piece which saturates at the lower magnetic flux level being configured to operate near saturation during the standby condition.

33. A passive magnetic unloading kit for a rotating machine which includes a housing; a field winding within the housing adapted to generate a magnetic flux; a pair of armature air gaps each defining a reluctance; and a rotor, the passive magnetic unloading kit comprising:
   a first pole piece defining a first cross-sectional area; and
   a second pole piece defining a second cross-sectional area which is different than the first cross-sectional area of the first pole piece;
   the pole pieces being adapted to be positioned between the housing and rotor, so that the pole pieces and the rotor define gaps there between and the gaps having reluctances approximately equal to each other,
   a first portion of the magnetic flux flowing through the housing, armature windings, and rotor and a second portion of the magnetic flux flowing through the housing, pole pieces, gaps, and rotor and the differing cross-sectional areas causing one of the pole pieces to saturate at a lower magnetic flux level than the other pole piece.

34. The passive magnetic unloading kit of claim 33, the cross-sectional area of one of the pole pieces varying along a length of the pole piece, the length of the pole piece defined by being parallel to the direction of a shaft connected to the rotor.

35. The passive magnetic unloading kit of claim 33, the gaps further configured to generate a user-selected net force.

36. The passive magnetic unloading kit of claim 35, the gaps further configured to generate a user-selected net force profile.

\* \* \* \* \*